Oct. 31, 1967  H. F. HAWKINS ETAL  3,349,981
STRIP FEED DEVICE

Filed June 21, 1965

INVENTOR
Harold Frederick Hawkins
Reginald Joseph Lloyd
BY
Alexander M Dowell
ATTORNEY Oct. 31, 1967  H. F. HAWKINS ETAL  3,349,981
STRIP FEED DEVICE Filed June 21, 1965  11 Sheets-Sheet 2

Oct. 31, 1967  H. F. HAWKINS ETAL  3,349,981
STRIP FEED DEVICE
Filed June 21, 1965
11 Sheets-Sheet 7

INVENTOR
Harold Frederick Hawkins
Reginald Joseph Lloyd
BY
Alexander Morrell
ATTORNEY

Oct. 31, 1967     H. F. HAWKINS ETAL     3,349,981
STRIP FEED DEVICE Filed June 21, 1965     11 Sheets-Sheet 11

INVENTOR
Harold Frederick Hawkins
Reginald Joseph Lloyd
By Alexander Powell
ATTORNEY

United States Patent Office 3,349,981
Patented Oct. 31, 1967

3,349,981
STRIP FEED DEVICE
Harold Frederick Hawkins and Reginald Joseph Lloyd, Dorset, England, assignors to Humphris & Sons Limited, Dorset, England
Filed June 21, 1965, Ser. No. 465,568
Claims priority, application Great Britain, June 24, 1964, 26,121/64, 26,123/64
14 Claims. (Cl. 226—155)

This invention relates to a pinch roller unit for strip processing machine tools such as power presses, roller feeds therefor, levelling machines, and measuring and feeding apparatus.

In feeding mechanisms applied to power presses it is usual to provide two sets of spring loaded pinch rollers which are driven intermittently by a rack and pinion arrangement and a one-way clutch connected to the crank of the press. The pair of rollers on the output side of the press are normally serrated in order to obtain sufficient grip on the strip thereby minimising slip between the rollers and the strip being fed. The necessity of providing plain rollers together with serrated rollers is both uneconomical and inconvenient for production and it is an object of the invention to overcome these disadvantages.

According to the invention there is provided a pinch roller unit comprising a pinch roller unit for feeding strip material, comprising in combination a pair of side plates connected rigidly to at least one transverse member so as to be disposed at a fixed distance apart, two pinch rollers formed with spindle ends disposed between said side plates one above the other and arranged in parallel relationship to each other and having adjacent spindle ends extending through one side plate, a pair of arms rigid with each other and being pivotally mounted on said side plates, the upper pinch roller being mounted by its spindle ends in bearings in said pair of arms, the lower pinch roller being mounted by its spindle ends in bearings carried in the side plates and being rotatable about a fixed axis, a pair of constant mesh gear wheels mounted on said one side plate, and a pair of gear wheels, meshing respectively with the constant mesh gear wheels, mounted at the spindle ends of the rollers which extend through said one side plate and force applying means connected to said arms capable of urging the upper pinch roller towards the lower roller wherein drive connection through the gears is maintained even when the arms are pivoted to move the upper roller towards or away from the lower roller.

When providing hydraulic pressure to clamp the roller on the arms against the other roller a greater grip on the strip is obtained as compared with known mechanical devices, without the necessity of serrating the rollers on the output side. With the use of hydraulic pressure two units may be made identical to each other. Compression springs or pneumatically operated cylinders may alternatively be used as the force applying means in the unit.

The provision of a pair of pinch rollers in a single unit or module facilitates the possibility of making various machines such as roller feeds, strip levellers, and press feed attachments in modular form. A strip leveller and other devices may be formed as modules. In this manner is achieved greater simplicity of design, greater range of machines made up of standardised modules, facilitation of replacements and general maintenance, and the reduction in production costs.

From a number of these modules it will be possible to assemble any of a number of the required apparatus. A power press feed attachment will comprise two identical basic pinch roller modules either mounted on the press bed or mounted on a plate adapted to suit the customer's existing press. A feeding and levelling machine will comprise two basic modules arranged one on each side of a leveller and all mounted on a common stand which is to be adapted to receive the various modules. The leveller module will be designed to match up with the basic module so that gear wheels provided in the modules for driving the rollers will be in train. The leveller rollers may be identical to the pinch roller.

A constructional form of the invention will now be described by way of example, together with various examples of machine tools made up from standard modules, with reference to the accompanying drawings in which.

Figure 1:
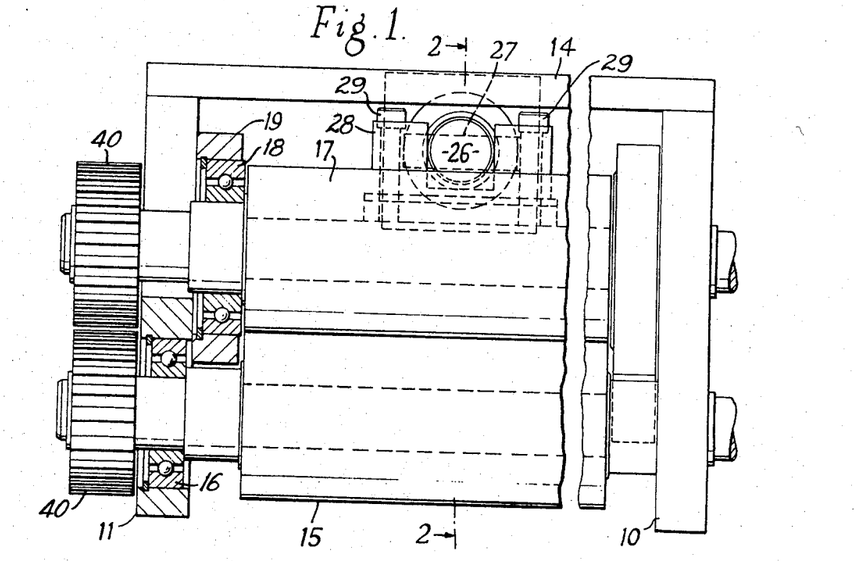
FIGURE 1 is a front part sectional elevation of a basic pinch roller module, the left hand part being a part section taken along line 1—1 in FIGURE 2.
Figure 2:
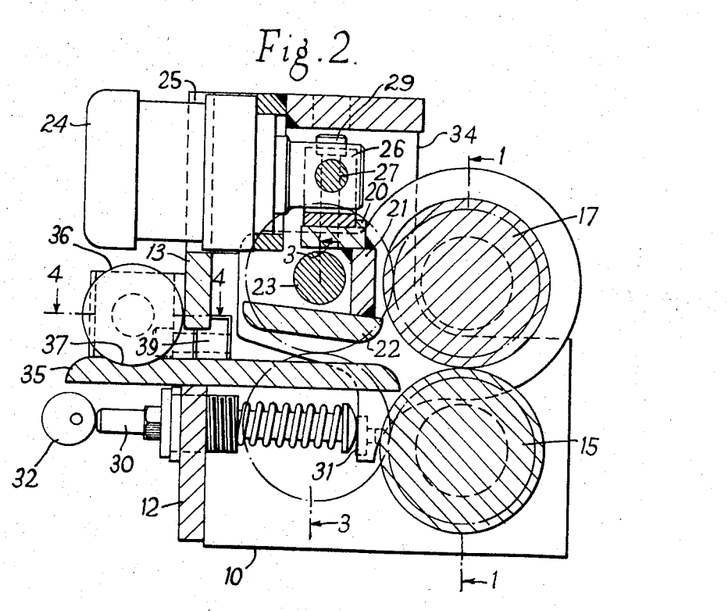
FIGURE 2 is a section taken along the line 2—2 of FIGURE 1.
Figure 3:
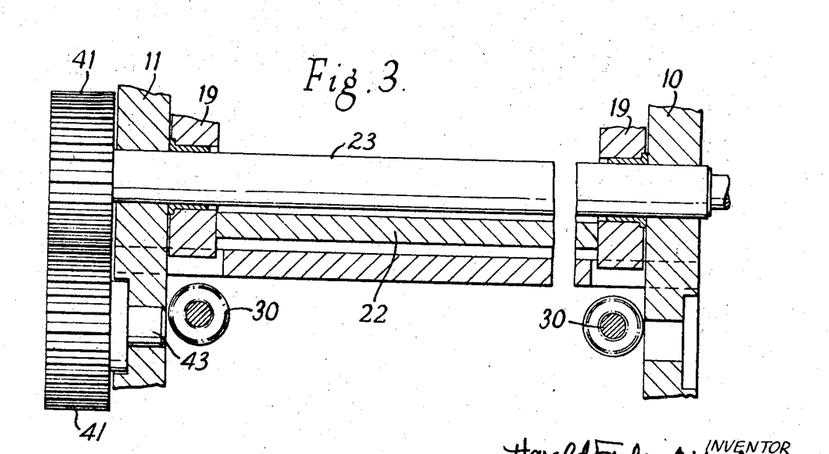
FIGURE 3 is a part section taken along the line 3—3 in FIGURE 2.

The basic pinch roller module shown in FIGURES 1, 2 and 3 comprises two side plates 10 and 11 and two transverse vertically disposed plates 12 and 13 connecting the two side plates together at a fixed distance apart and parallel to each other. A further transverse plate 14 is provided which is attached to the upper horizontal edges of the two sides plates. The two side plates and the three transverse plates therefore form a rigid framework for supporting the pinch rollers. The transverse plates 12 and 13 are spaced apart one above the other to permit entry of the strip to be fed. The side plates are provided with tapped holes on their undersides whereby they may be secured to a plate or stand as desired.

The lower pinch roller 15 is mounted on bearings 16 carried in the plates 10 and 11 and is rotatable about a fixed axis. The upper roller 17 is supported in bearings 18 by a carrier comprising two pivoted arms 19 connected rigidly together by a channel shaped element consisting of three plates 20, 21, 22 welded together and to the arms 19, the plate 22 being inclined so as to provide a lead towards the pinch rollers. The arms 19 are pivoted on a fixed shaft 23 extending through the side plates 10, 11. By means of the carrier the upper pinch roller may swing in an arc to and away from the lower pinch roller. In the normal operating position the two pinch rollers are in engagement with each other.

The upper pinch roller is forced into engagement with the strip towards the lower roller by means of a hydraulic ram 24 which passes through an opening 25 provided in the plate 13 and is supported by the plate 14. The extension of the ram piston 26 has a bore through which a pin 27 engages with a sliding fit, which pin is mounted in a bracket 28 attached by screws 29 to the plate 20 of the carrier. As an alternative in cases where a lower engagement pressure between upper and lower rollers is desirable a compression spring can be employed in place of the ram. Also a pneumatic ram may be used as an alternative.

Release devices in the form of spring loaded rods 30 are carried in the bottom transverse plate 12 and engage projections 31 formed on the arms to urge the carrier upwardly to effect disengagement of the rollers at the moment when the ram is inoperative. Where compression springs are used instead of a ram the release mechanism comprises rods similar to those shown engaging projections 31 but with rotatable cam 32 shown in chain dotted lines on FIGURE 2 driving the rods. The springs on the rods in this case are not required.

The side plates 10 and 11 are cut away at 34 as shown whereby the upper roller is free to swing. Alternatively, slots may be provided in the side plates.

Figure 4:
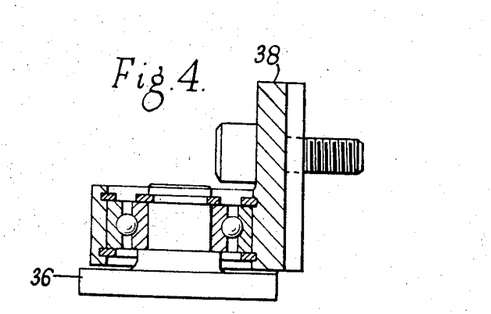
FIGURE 4 is a section of a guide wheel assembly taken along the line 4—4 in FIGURE 3.
Figure 5:
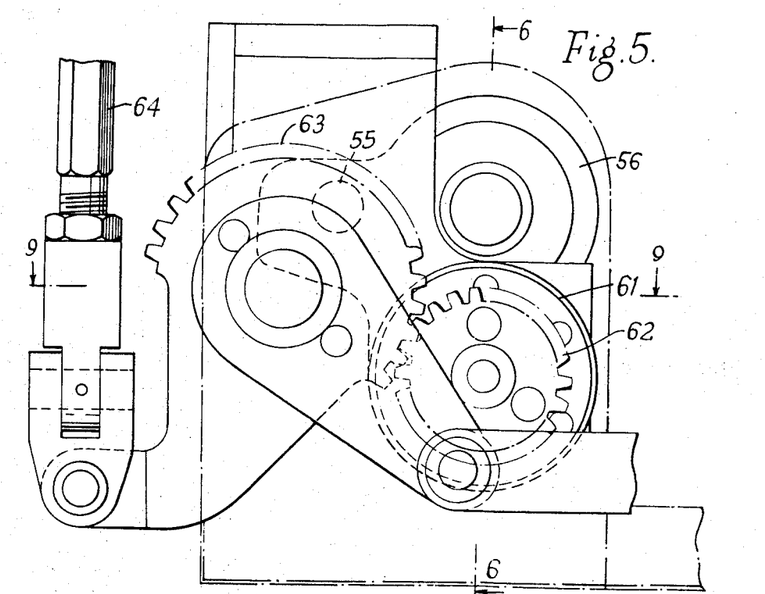
FIGURE 5 is a side elevation of a further pinch roller module including the driving mechanism therefor.
Figure 6:
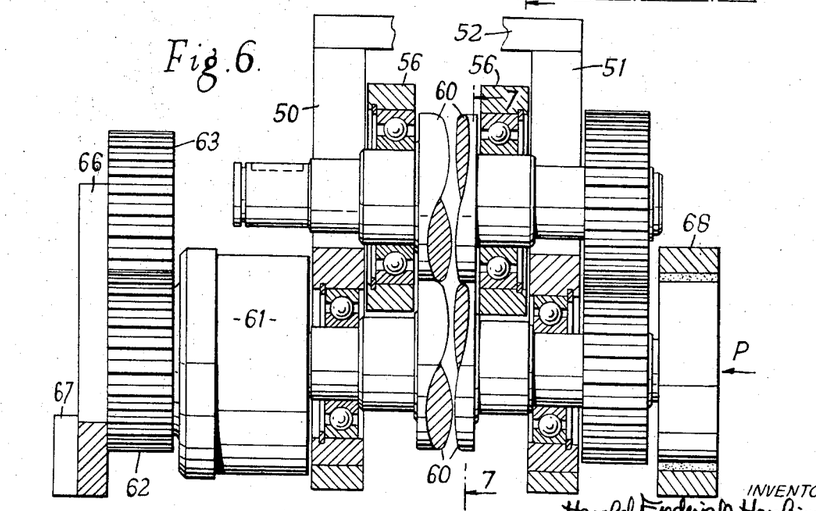
FIGURE 6 is a section taken along the line 6—6 of FIGURE 5.
Figure 7:
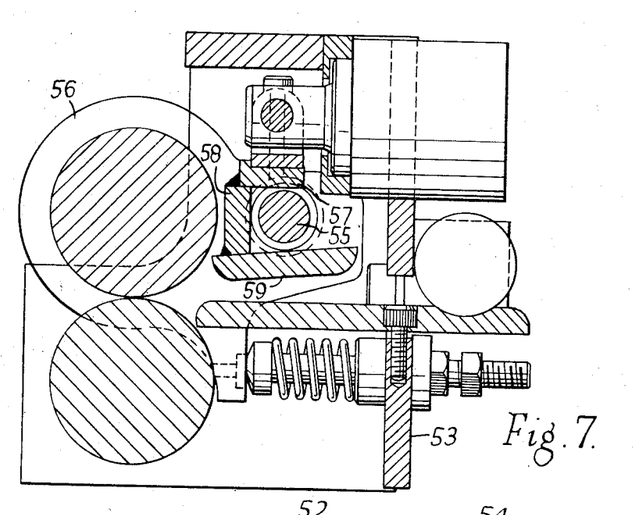
FIGURE 7 is a section taken along the line 7—7 of FIGURE 6.
Figure 8:
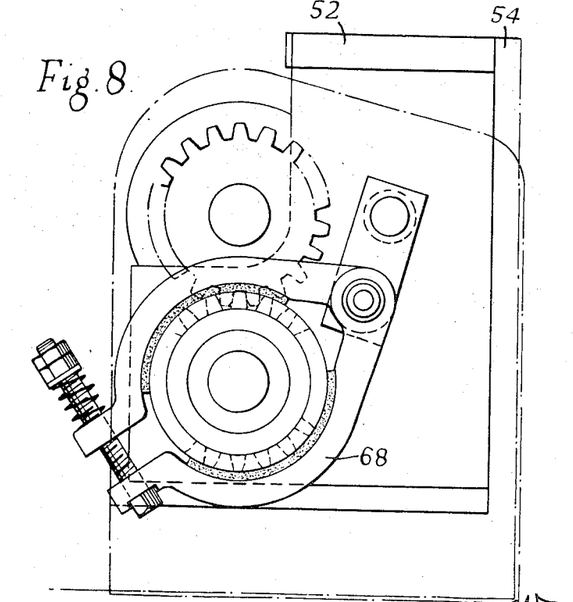
FIGURE 8 is a side elevation of the module seen in the direction of the arrow P on FIGURE 6.
Figure 9:
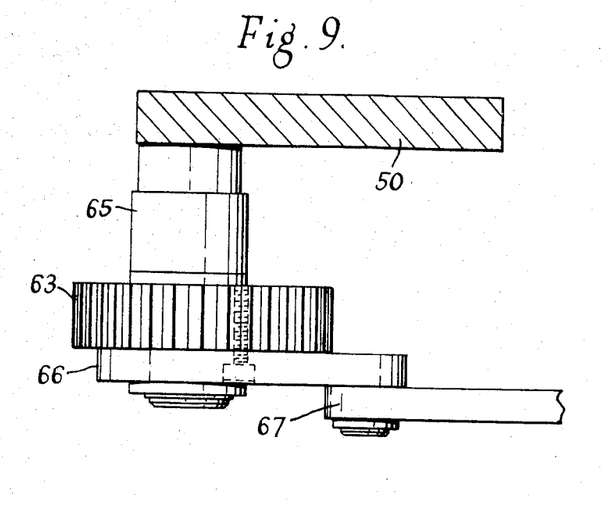
FIGURE 9 is a part section taken along the line 9—9 of FIGURE 5.

Between the sides plates and along the upper edge of the lower transverse plate 12 is provided a flat horizontal feed plate 35. The upper surface of this plate lies in a plane which contains the line of contact of the two pinch rollers. Guide wheels 36 are provided on the plate 35 and are arranged so that portions of the wheels enter a groove 37 extending transversely of the plate 35. This ensures that the plate being guided by the wheels has a line contact along the sides of the wheels instead of a point contact on the periphery as is known hitherto. The wheels 36 are carried on angle brackets 38 (see FIGURE 4) and have a clamp arrangement 39 by which the brackets are fastened to the lower marginal portion of the transverse plate 13. By releasing the clamps the distance between the guide wheels may be adjusted to suit the width of the strip being fed.

The pinch rollers are driven through gear wheels 40 provided at the ends of the rollers, the gear wheels 40 mesh respectively with meshing gear wheels 41 mounted respectively on the end of the fixed shaft 23 and a stub shaft 43. The gears are always constantly in mesh despite the movement of the upper roller. Consequently, the jarring of the mechanisms known in previous devices due to the gears disengaging and engaging as the rollers are moved apart is obviated in this example.

A further advantage is achieved in that the provision of two arms arranged to pivot together ensures that the rollers are maintained parallel to each other. This minimizes the likelihood of strip tending to skew in the case when the strip has a slightly tapering cross section or if a burr remains along the edge of the strip as is known in pinch roller arrangements in which the ends of the upper roller is carried in chocks.

The drive mechanism may be in the form of a rack and pinion arrangement or a crank. In FIGURES 5 to 9 a further form of the invention is shown in which a crank drive mechanism is shown. In this example, however, the gear train is not employed but instead the gear wheels provided at the ends of the pinch rollers are in mesh. The crank mechanism may be applied to the previous example.

As before the module comprises two side plates 50 and 51 connected by transverse plates 52, 53 and 54 which form a rigid frame supporting a carrier pivoted on a fixed shaft 55 and consisting of two arms 56 welded to three plates 57, 58 and 59. A release device is constructed in a similar manner to the previous example.

On one side of the module the pinch rollers 60 are provided with meshing gear wheels. On the other side, the lower pinch roller has a one way clutch 61 and a gear wheel 62. The gear wheel 62 is engaged by a toothed quadrant 63 which is pivotally connected to a link 64 which, in turn, is connected to the crank attached to the crank shaft of the press. The quadrant 63 is pivoted on a shaft 65 extending from one of the side plates 50 (see FIGURE 9). A lever 66 is attached by screws 67 to the quadrant and serves together with the link 64 to effect simultaneous drive of an identical module provided on the press.

On reciprocation of the link 64 an intermittent one way drive of the pinch rollers is achieved. A brake arrangement 68 is provided at the end of the lower pinch roller outside the gear wheel and prevents back lash which could otherwise occur since the gear wheels are not in contact mesh in this example.

By constructing modules in this manner no supporting feet are necessary and consequently expensive framework castings are no longer required. Furthermore, the swinging arm type carrier for the pinch rollers permits the use of standard radial thrust bearings instead of the specially produced bronze bearings which are necessary in the previously known sliding chock arrangement in which bearing space is severely limited.

By providing a carrier for the upper pinch roller only one hydraulic or pneumatic cylinder or compression spring need be used in most small machines, whereas in the known chock arrangement a pressure device was necessary at each chock.

A further advantage achieved by the provision of hydraulic or pneumatic pressure means is the avoidance of the use of the usual cumbersome tappet arrangement which is provided on the press to lift the upper pinch roller to relieve the pressure on the strip being fed during the moment of accurate location of the strip in the correct position by a pilot tool prior to punching. In the present arrangement the pressure may be relieved by operation of a hydraulic valve controlling the ram.

A pinch roller module may be provided singly or in tandem with another pinch roller module on a base plate specially adapted for application to a customer's existing press. The base plate may, if required, be extended to receive a leveller module thus achieving a saving in floor space since the leveller device is normally a separate machine having its own stand.

Figure 10:
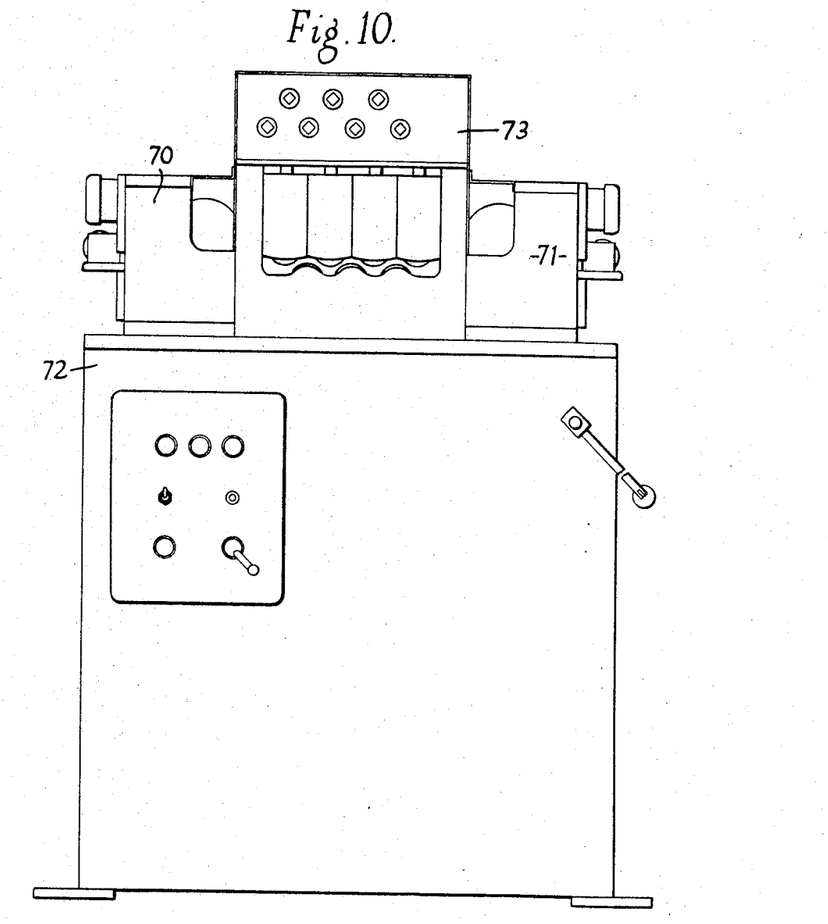
FIGURE 10 shows a strip levelling machine having a basic leveller module and two basic pinch roller modules mounted on a common base.
Figure 11:
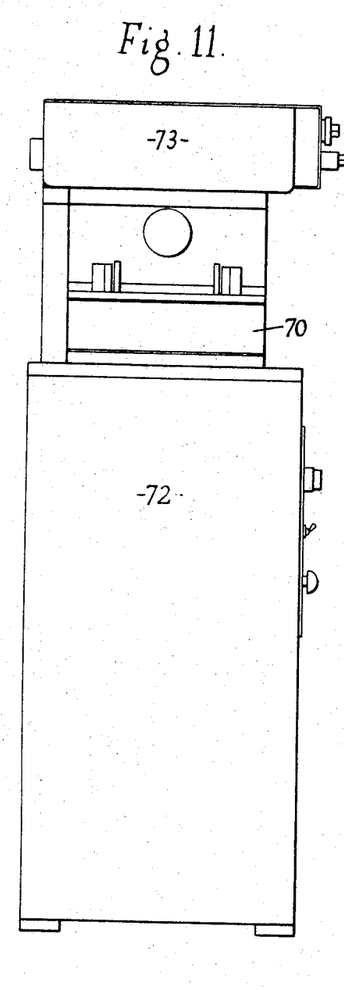
FIGURE 11 is a side elevation of the levelling machine.

In the arrangement shown in FIGURES 10 and 11 two identical pinch roller modules 70, 71 are provided on a stand 72 together with a leveller module 73. Conveniently the hydraulic pump necessary for supplying the rams on the pinch roller modules, together with a fluid reservoir, are provided in the stand. Other control devices necessary for the timing of the feeding operation may be provided within the stand.

Figure 12:
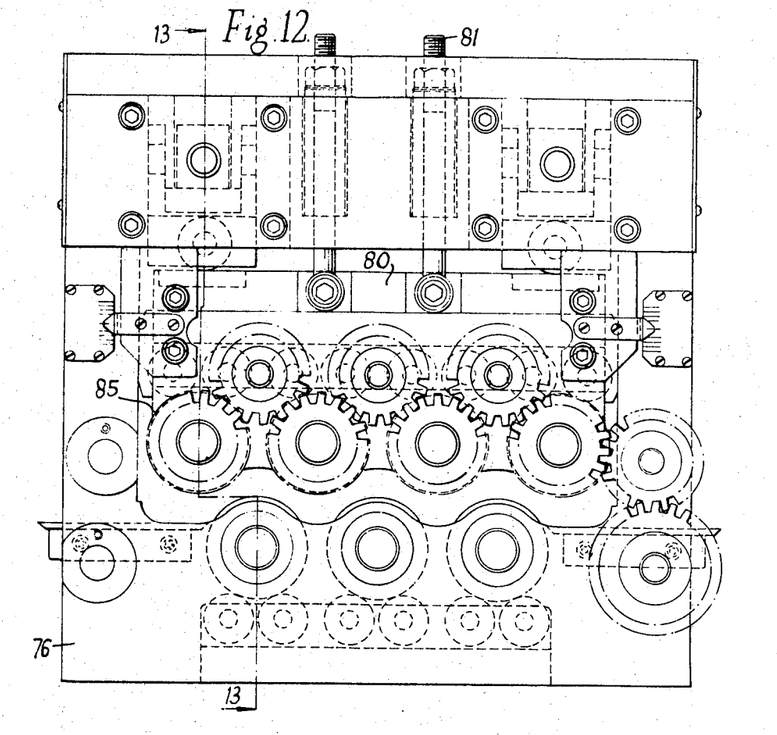
FIGURE 12 is a side elevation of the basic leveller module.
Figure 13:
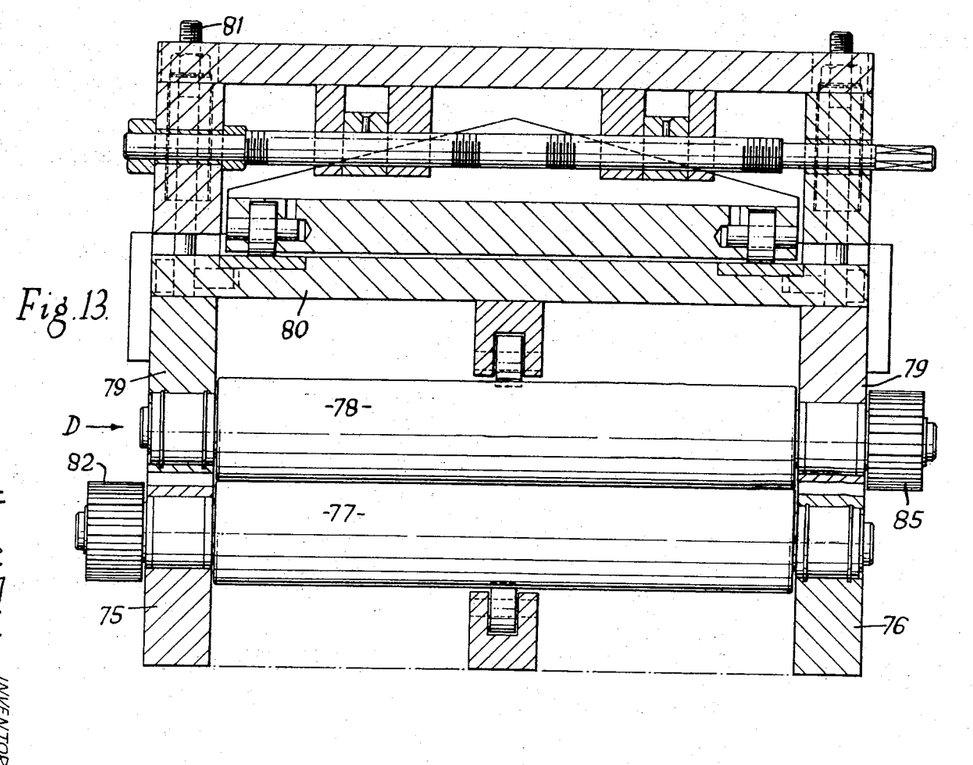
FIGURE 13 is a section taken along the line 13—13 of FIGURE 12.
Figure 14:
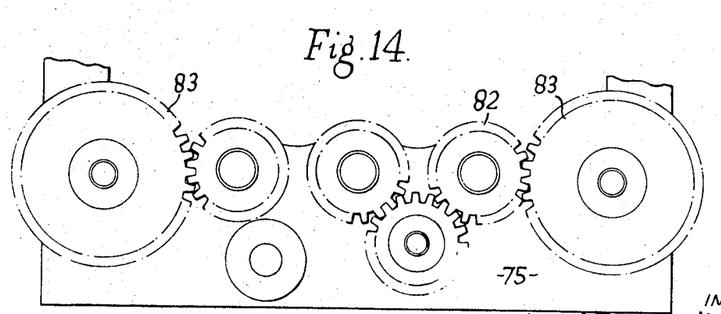
FIGURE 14 is a part elevational view seen in the direction of arrow D in FIGURE 13.

The leveller module shown in FIGURES 10 and 11 is shown in greater detail in FIGURES 12, 13 and 14. The leveller module is formed having two side plates 75, 76 carrying between them a series of lower rollers 77. A series of upper rollers 78 are carried on a pair of chocks 79 movable vertically in openings in said side plates. The chocks 79 are attached to a chock plate 80 supported by a number of rods 81 which are adjustably mounted in the side plates.

On one side of the leveller (see FIGURE 14) the ends of the lower series of rollers are provided with gear wheels 82 which are in train, the end wheels 83 being of such size and so positioned that part of each wheel extends beyond the end of the side plate. This is to facilitate meshing of these end gears with the gear wheels on the lower pinch rollers of two pinch roller modules bolted close against each side of the leveller module whereby drive for the rollers of the leveller module is derived from the pinch roller modules.

The upper rollers are also connected to rotate together by a gear train 85 provided on the opposite side of the leveller to that shown in FIGURE 14, the two trains being connected together by further gear wheels. The rollers may be identical to the pinch rollers for convenience of manufacture.

Figure 15:
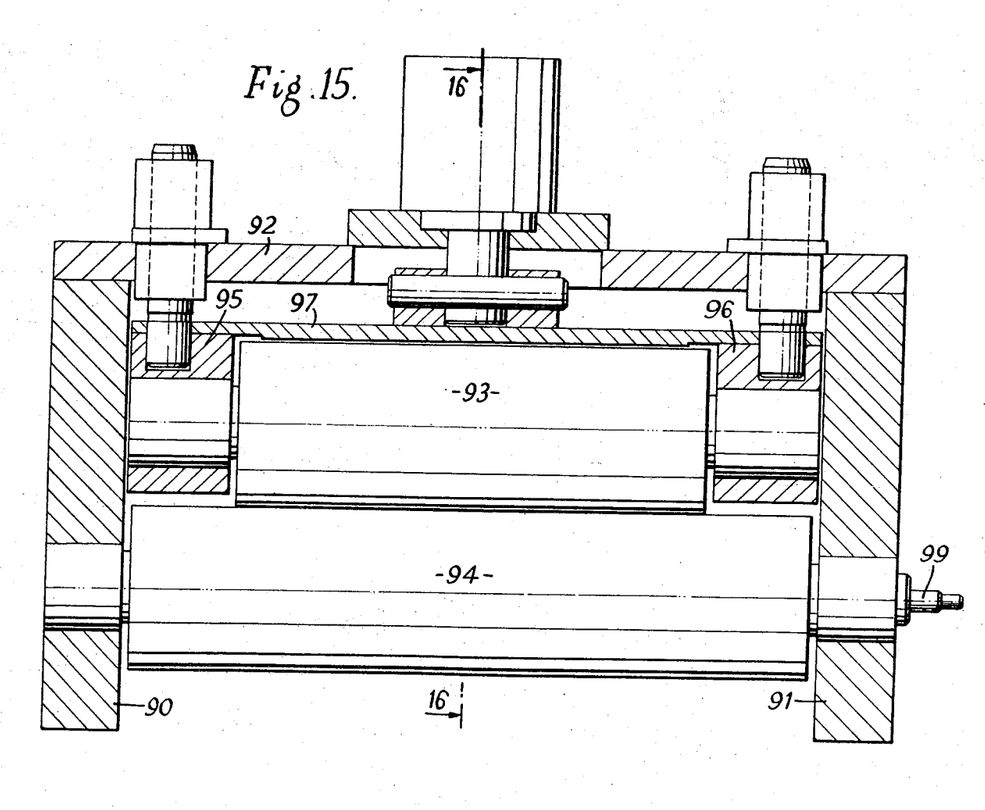
FIGURE 15 is a sectional view taken through a measuring roller module adapted for application to the common base.
Figure 16:
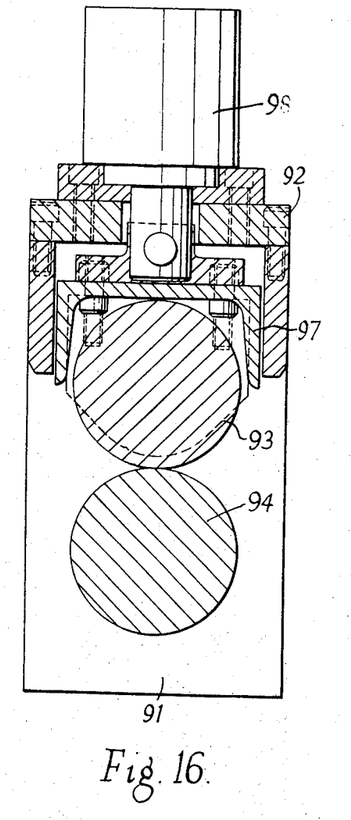
FIGURE 16 is a section taken along the line 16—16 in FIGURE 15.
Figure 17:
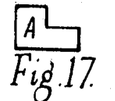
FIGURES 17 to 24 represent various modules for arrangement together.
Figure 18:
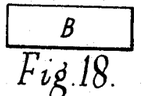
Figure 19:
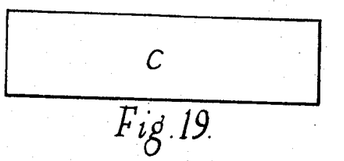
Figure 20:
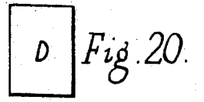
Figure 21:
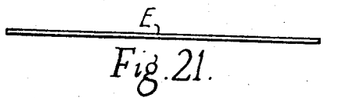

In place of or together with the leveller module there may be provided a measuring roller module. Such an arrangement is shown in FIGURES 15 and 16 and simply comprises two end plates 90, 91 connected together by a cross member 92 and carrying a pair of measuring rollers 93, 94. The ends of the upper roller 93 are carried in bearing blocks 95, 96 supported at the end of a channel 97. The upper roller 93 can be forced towards the lower one 94 by means of a hydraulic ram 98 to ensure that the strip being fed does not slip between the rollers. One end of the lower roller 94 is suitably shaped at 99 for connection to a drive cable (not shown) leading to an arrangement controlling the feed of the strip such as is described in our United Kingdom Patent No. 942,820.

The base may be adapted to receive various combinations of modules as described and may also have on one side a decoiler module (not shown in detail). This may consist of a reel mounted in a pair of plates welded to a vertical bearing plate which will be bolted to the side of the base. The reel may have a brake to prevent a loop forming between the decoiler and the pinch roller module. It is possible to provide a decoiler such as this since sufficient grip is obtained with a hydraulically damped pinch roller thus obviating the necessity of providing a motor driven reel which, in turn, necessitates the provision of a loop between the decoiler and leveller. In this way less floor space is taken up.

On the opposite side to that having the decoiler a shear module may be attached. This too may be operated hydraulically from the mechanism provided within the stand. An example of a hydraulically operated shear mechanism is disclosed in our co-pending United States patent application Serial No. 465,555, filed June 21, 1965.

In the leveller machine comprising a base having a leveller module sandwiched by two pinch roller modules using hydraulic fluid for applying pressure to the pinch rollers, it is advantageous to use a fluid motor to drive the pinch rollers. Where the method of end registry of the strip is used a considerable advantage is gained by using a hydraulic motor over an electric one. Since the inertia of the hydraulic motor is comparatively low it may be accelerated and retarded very rapidly. In operation of the leveller the strip will pass through the input pinch roller module to the leveller module and from there to the output pinch roller module and will be conveyed at high speed until the end operates a microswitch. The microswitch actuates the control mechanism so that the hydraulic motor drives the pinch roller and leveller at creep speed until the end of the strip engages a stop. In view of the low inertia of the motor the strip is stopped without any buckling taking place and the strip is maintained in engagement with the stop by the continued operation of the hydraulic motor. The fed strip is now cut off or worked and the feed cycle is then repeated.

The hydraulic drive motor for the pinch roller module may be provided with a hydraulic bleed circuit which comes into operation just prior to the stamping position in the case of presses and before the shearing position in the case of a combined feeding, levelling, measuring and shearing machine.

In the case of the use of measuring rollers the motor torque may be reduced to such a value that the pinch rollers may be clamped to stop forward feed of the strip without the prime mover overcoming the clamping effect.

Where it is necessary to maintain the strip being fed through two pinch roller modules taut a hydraulic drive motor may be provided for each pinch roller module. The mechanical coupling in this case will be omitted. The first motor on the output side of the feed device will be rotated in the normal direction to effect feeding of the strip. The second motor on the input side will be driven in the opposite direction but with much less torque than in the first motor so that the latter overrides the reverse driving effect of the second motor which merely applies a braking force to the strip.

In FIGURES 17 to 24 each module is represented in block form as follows:

A is a basic roller module,
B is a leveller module,
C is a stand for supporting the modules,
D is a pinch roller stand,
E is a base plate adapted for attachment to a customer's existing press,
F is a shear module,
G is a gripper feed module,
H is a decoiler module,
J is a measuring roller module.

Figure 22:
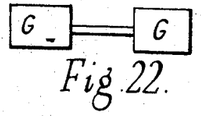
Figures 22A, 25, 26, 27, 28, 29, 30, 31, 32:
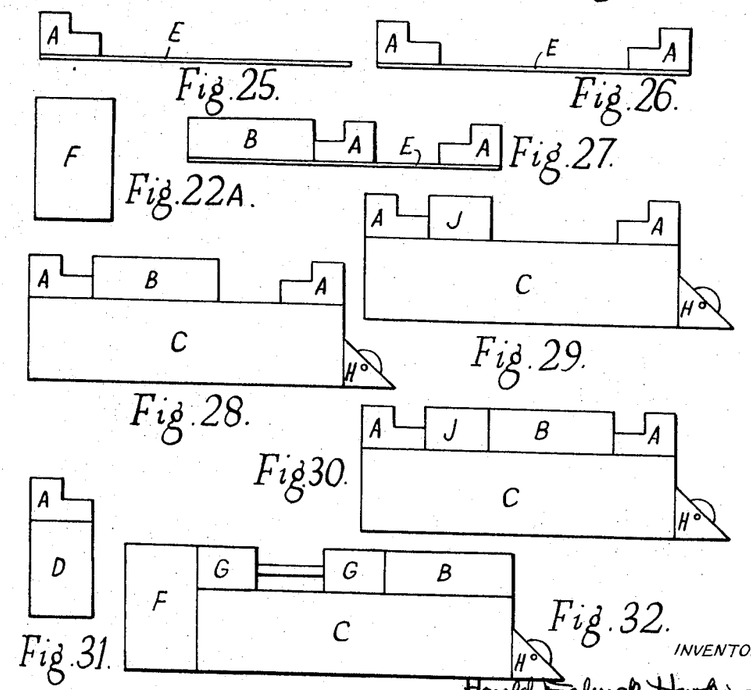
FIGURES 25 to 32 are schematic diagrams indicating the various ways in which modules can be arranged according to requirements.
Figure 23:
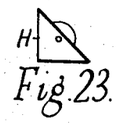
Figure 24:
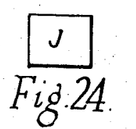

The modules may be arranged in various ways, viz:

FIGURE 25 shows a power press feed attachment comprising a base plate E supporting a single basic roller module A.

FIGURE 26 shows a power press feed attachment having two basic roller modules A mounted, one the opposite way round to the other, on a base plate E.

FIGURE 27 shows a press mounted and driven roller feed leveller having two roller modules A, a leveller module B and a base E.

FIGURE 28 shows an arrangement comprising two roller modules A, a leveller module B, a stand C, and a decoiler module H, which arrangement may either be a powered leveller having continuous feed or a feeding and levelling machine with intermittent feed.

FIGURE 29 shows a feeding and strip length measuring machine having two roller modules A, a measuring roller module J and a decoiler module H, all mounted on a stand C.

FIGURE 30 shows a feeding, levelling and strip length measuring machine having two roller modules A, a leveller module B, a measuring roller module J and a decoiler module H, all mounted on a stand C.

FIGURE 31 shows a powered pinch roller machine comprising a basic roller module A mounted on a pinch roller stand D.

FIGURE 32 shows a machine comprising a gripper feed module G, a leveller module B, a shear module F and a decoiler module H, all mounted on a stand C whereby predetermined lengths of strip may be cut according to the preset length of stroke of the gripper feed.

A constructional example of the shear module and gripper module is disclosed in co-pending United States patent application Serial No. 465,555, filed June 21, 1965.

What is claimed is:

1. A pinch roller unit for feeding strip material, comprising in combination a pair of side plates connected rigidly to at least one transverse member so as to be disposed at a fixed distance apart, two pinch rollers formed with spindle ends disposed between said side plates one above the other and arranged in parallel relationship to each other and having adjacent spindle ends extending through one side plate, a pair of arms rigid with each other and being pivotally mounted on said side plates, the upper pinch roller being mounted by its spindle ends in bearings in said pair of arms, the lower pinch roller being mounted by its spindle ends in bearings carried in the side plates and being rotatable about a fixed axis, a pair of constant mesh gear wheels mounted on said one side plate, and a pair of gear wheels, meshing respectively with the constant mesh gear wheels, mounted at the spindle ends of the rollers which extend through said one side plate and force applying means connected to said arms capable of urging the upper pinch roller towards the lower roller wherein drive connection through the gears is maintained even when the arms are pivoted to move the upper roller towards or away from the lower roller.

2. A pinch roller unit according to claim 1, wherein the gear wheel of the upper roller is capable of engagement with the gear wheel of the lower roller when the rollers are in engagement with each other or with the strip being fed.

3. A pinch roller unit according to claim 1, wherein two transverse plates attached to the upright edges of the side plates are disposed vertically and spaced apart so as to form an opening adjacent the peripheral engagement of the two rollers, said opening permitting entry of the strip under treatment.

4. A pinch roller unit according to claim 3, wherein a horizontal feed plate is provided on the upper edge of the lower transverse member, the upper surface of the feed plate lying in a plane which contains the line contact of the two rollers.

5. A pinch roller unit according to claim 4, wherein guide wheels are provided for the strip and are so mounted that lower portions of the wheels enter a transverse groove formed in the feed plate.

6. A pinch roller unit according to claim 5, wherein brackets are provided to carry the guide wheels, which brackets are clamped to the lower marginal portion of the upper transverse member.

7. A pinch roller unit according to claim 1, wherein the two arms supporting the upper roller are rigidly connected together by a channel shaped element comprising three plates welded together and to the arms.

8. A pinch roller unit according to claim 7, wherein one plate of the channel shaped element is arranged horizontally and above another of said plates, the third being substantially vertical, the lower plate being inclined in relation to the path of travel of the strip towards the rollers so as to effect guidance of said strip towards the position of engagement of said rollers.

9. A pinch roller unit according to claim 8, wherein the force applying means is in the form of a hydraulic ram mounted on the transverse member attached to the side plates, said ram having a piston connected to the horizontally arranged plate of said channel shaped element.

10. A pinch roller unit according to claim 9, having a bracket attached to said horizontally arranged plate and wherein said piston is connected to said upper plate by means of a pin engaging with sliding fit within a bore of said piston, which pin being mounted on said bracket.

11. A pinch roller unit according to claim 1, wherein the two arms are pivoted on a fixed shaft extending through the side plates.

12. A pinch roller unit according to claim 1, wherein the force applying means is in the form of a fluid operated ram.

13. A pinch roller unit according to claim 1, wherein the force applying means is in the form of at least one compression spring.

14. A pinch roller unit according to claim 1, wherein release devices in the form of spring loaded rods are carried in a transverse member and engage projections formed on the arms to urge the upper roller upwardly to effect disengagement of the rollers when the force applying means is inoperative.

References Cited

UNITED STATES PATENTS

| | | | |
|---|---|---|---|
| 1,481,886 | 1/1924 | Berg | 226—155 |
| 1,787,558 | 1/1931 | Tinsman | 226—194 X |
| 2,337,065 | 12/1943 | Price | 271—51 |
| 2,348,456 | 5/1944 | Dickerman | 226—154 |
| 2,723,441 | 11/1955 | Groce | 226—176 X |
| 3,246,822 | 4/1966 | Skeen | 226—155 |
| 3,263,284 | 8/1966 | Orr | 226—176 X |

M. HENSON WOOD, JR., *Primary Examiner.*

R. A. SCHACHER, *Assistant Examiner.*